United States Patent
Miller et al.

(10) Patent No.: US 8,627,068 B1
(45) Date of Patent: Jan. 7, 2014

(54) SELECTING ACCESS AUTHORITIES

(75) Inventors: Mark S. Miller, Baltimore, MD (US); Marc D. Stiegler, Kingman, AZ (US)

(73) Assignee: Hewlett-Packard Development Company, L. P., Houston, TX (US)

(*) Notice: Subject to any disclaimer, the term of this patent is extended or adjusted under 35 U.S.C. 154(b) by 2820 days.

(21) Appl. No.: 11/118,158

(22) Filed: Apr. 29, 2005

(51) Int. Cl.
   *H04L 29/02* (2006.01)

(52) U.S. Cl.
   USPC .......................................................... 713/164

(58) Field of Classification Search
   USPC .......................................... 713/164, 165, 166
   See application file for complete search history.

(56) References Cited

U.S. PATENT DOCUMENTS

| | | | |
|---|---|---|---|
| 6,047,312 A | 4/2000 | Brooks et al. | |
| 6,289,462 B1 | 9/2001 | McNabb et al. | |
| 6,629,109 B1 | 9/2003 | Koshisaka | |
| 7,231,640 B2 | 6/2007 | Evans et al. | |
| 7,275,264 B2 | 9/2007 | Cuenod et al. | |
| 2003/0061504 A1* | 3/2003 | Sprigg et al. | 713/200 |

OTHER PUBLICATIONS

Stiegler, M. et al., "A Capability Based Client: The DarpaBrowser", Combex Inc., Jun. 26, 2002.

* cited by examiner

*Primary Examiner* — Ellen Tran (57) ABSTRACT

Group access authorities for a restricted user account group in a directory system are selected to include directory traverse authority. A restricted user account is included in the restricted user account group such that the restricted user account inherits group access authorities. The directory system is configured to allow directory traversing without performing directory traverse checking. An application is confined to run within the restricted user account so that access authorities of the application include group access authorities.

30 Claims, 8 Drawing Sheets

SELECTING ACCESS AUTHORITIES

BACKGROUND

In the past few years, computer viruses have caused damage to computer systems throughout the world. A computer virus is a program capable of operation on a computer system, such as a personal computer, that is self-replicating and that can "infect" other programs by modifying them or their environment such that a call to an infected program results in an action that the user may not like.

Computer systems today typically run operating systems having user accounts for users of the systems. A user logs into the computer system under a user account and has authorities to add, edit, delete or use most of the resources available in the computer system. Additionally, applications running in the user's account have the same authorities as the user. This arrangement presents a computer virus with a doorway to most of the resources in the computer system. For instance, if an application is infected by a virus, the virus is able to spread to any resource that the application may access including other files located on the computer system. Conventional virus detection software may be unable to stop the spread of these viruses before they do irreparable damage.

SUMMARY

According to an example, a method includes selecting group access authorities for a restricted user account group in a directory system include directory traverse authority. A restricted user account is included in the restricted user account group such that the restricted user account inherits group access authorities. The directory system is configured to allow directory traversing without performing directory traverse checking. An application is confined to run within the restricted user account so that access authorities of the application include group access authorities.

BRIEF DESCRIPTION OF THE DRAWINGS

Embodiments of the invention are illustrated by way of example and without limitation in the accompanying figures in which like numeral references refer to like elements, and wherein.

DETAILED DESCRIPTION

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures have not been described in detail so as not to unnecessarily obscure the examples.

Throughout the present disclosure, reference is made to access authorities. The access authorities may be defined as rights to access resources in a computer system. The resource may be a file in a directory of a computer system. The access authorities may control the rights of accounts, for instance a user account, to access data in a variety of manners. For example, the access authorities may provide the user account with read-only and/or execute access to an executable file for running an application. In addition, the access authorities may provide the user account with access to a data file used by the application. The term "access," when unqualified, includes at least read and write access authorities to a file.

Reference is also made to a restricted user account. The restricted user account may be defined as an account provided access authorities (referred to as individual access authorities) to fewer resources than the user's login account. A software application, to be confined, runs within the restricted user account. The restricted user account may have the individual access authorities to access an executable file for the application and any other file necessary to complete a task for the application. For example, the restricted user account, and likewise the application, may have read-only and/or execute access to an executable file which started the application and read/write access to support files or directories containing the support files used by the application.

Reference is also made to a restricted user account group. The restricted user account group may be defined as an account group having predetermined access authorities (referred to as group access authorities). The restricted user account group may be used to select the individual access authorities for the restricted user account by including the restricted user account in the restricted user account group. The individual access authorities of the restricted user account may correspond to the group access authorities of the restricted user account group. In another example, the individual access authorities may include additional access authorities as compared to the group access authorities either increasing or decreasing a number of resources available to the restricted user account. For instance, the group access authorities inherited by the restricted user account may include read-only or execute access to a directory while the individual access authorities may further include write access to the directory. The access authorities may include both the individual access authorities and/or the group access authorities. It should be understood, however, that the access authorities may be grouped, defined, categorized, and/or labeled in a variety of manners without changing the scope of examples shown herein. It should also be understood that the concept of the restricted user account group may be implemented by simply explicitly detailing individually for each restricted account all the rights conceptually assigned to the group.

Viral vulnerabilities of a computer system may be reduced by controlling an application's access authorities to resources within the computer system. Reducing or controlling the scope of access authorities of an application may also reduce potential damage done to the computer system by a virus. For instance, a word processor application may have read-only access authorities to the executable file that started the word processor. Therefore, a virus attacking the word processor application may not alter the executable file. This reduces virus spreading.

In one example, access authorities of an application are reduced by confining the application to run within a restricted user account. This may be accomplished by selecting group access authorities for a restricted user account group. The restricted user account is included in the restricted user account group such that the restricted user account inherits the group access authorities. In this manner, the access authorities of the application include the group access authorities.

In some examples, the group access authorities may be selected to include read-only or execute access to files within a program files directory. The program files directory may be defined as any directory having executable files for applications. The group access authorities may also be selected to include read-only and/or execute access to files within an operating system directory. The operating system directory may be defined as any directory having files for supporting functioning of the operating system. The group access authorities may also be selected to exclude access to files within a root directory of a directory system. In other examples, a directory system may be configured to allow directory traversing by an application without performing directory traverse checking.

Individual access authorities for the restricted user account may be selected to extend the access authorities of the application. This may allow the application to access files within a data directory for reading and writing. For instance, selecting individual access authorities for the restricted user account may allow a word processing application confined therein to write data to a text file.

Figure 1:
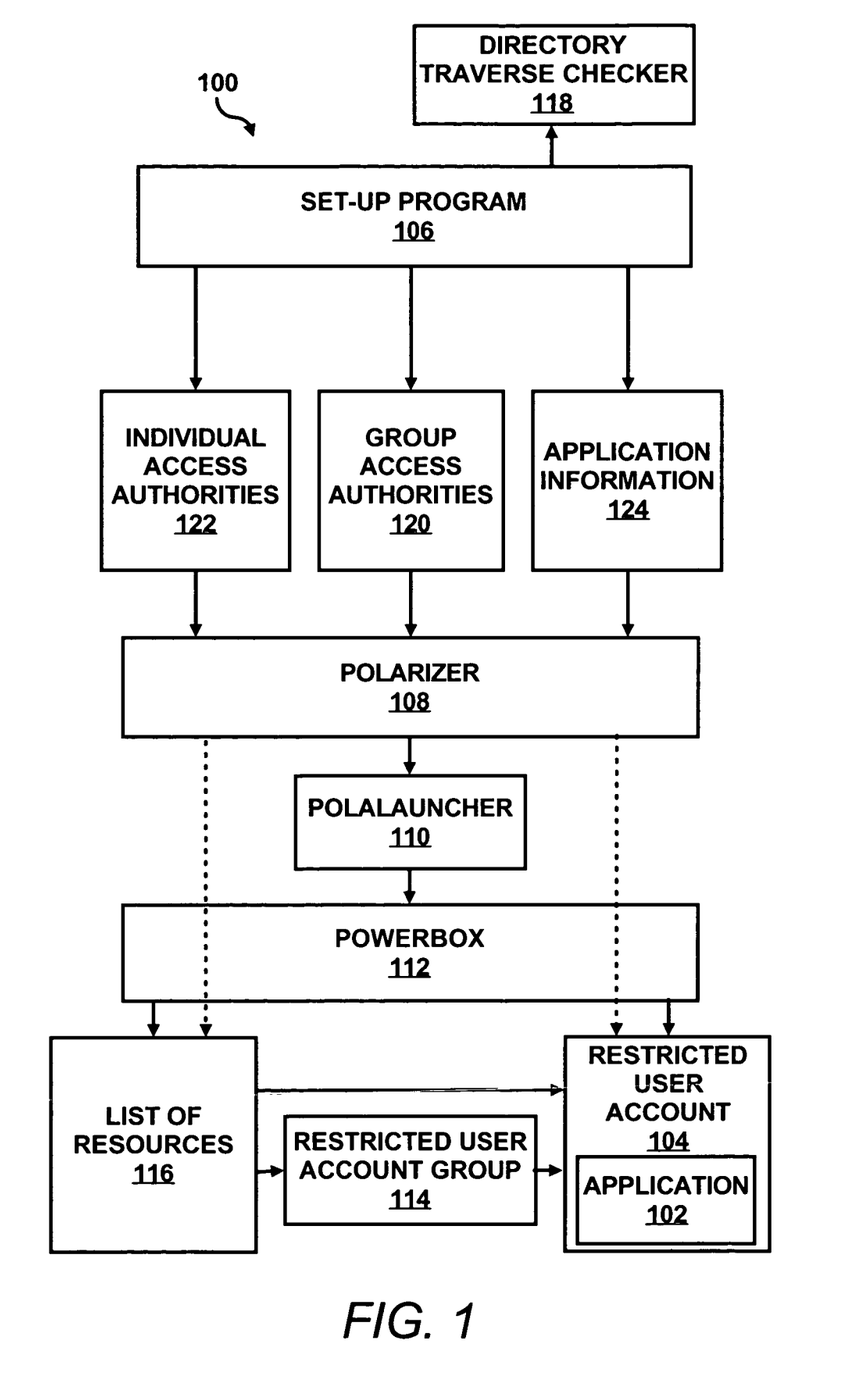
FIG. 1 shows a block diagram of a system for setting access authorities in accordance with an example of the invention.

With reference first to FIG. 1, there is shown a block diagram of a system 100 for selecting access authorities. The system 100 includes an application 102, a restricted user account 104, a set-up program 106, a polarizer 108, a polalauncher 110, a powerbox 112, a restricted user account group 114, a list of resources 116, and a directory traverse checker 118. The application 102 may be confined to run within the restricted user account 104 by the polarizer 108. The set-up program 106 designates group access authorities 120, individual access authorities 122, and application information 124 providing these to the polarizer 108. The set-up program 106 may also configure the directory traverse checker 118 to allow directory traversing without performing directory traverse checking.

The polarizer 108 accepts as inputs the individual access authorities 122, the group access authorities 120, and the application information 124. The individual access authorities 122 may be input by a user selecting a resource or resources that will available to the application 102 through the restricted user account 104. The application information 124 may include the name and/or path of an executable file for the application 102. The polarizer 108 accepts the individual access authorities 122 and application information 124 and may create a polalauncher 110 for the application 102. The polalauncher 110 may be configured to ensure that the application 102 runs within the restricted user account 104, that is, the application 102 is confined to run within the restricted user account 104. Examples of creating and using the polalauncher 110 may be found in co-pending and commonly assigned U.S. patent application Ser. No. 11/047,015 filed Jan. 31, 2005, and entitled "Launching An Application In A Restricted User Account," the disclosure of which is hereby incorporated by reference.

In one example, the polarizer 108 may modify the list of resources 116 to include the individual access authorities 122 for the restricted user account 104. In another example, the polarizer 108 may provide the individual access authorities 122 (or instructions to modify the predetermined set of authorities in the powerbox 112) to the polalauncher 110. The polalauncher 110 includes this information when sending the request to the powerbox 112 that then modifies the list of resources 116 for the restricted user account 104 upon request.

The list of resources 116 may be accessible to the polarizer 108 and/or the powerbox 112 and includes a listing of resources available to accounts and account groups within an operating system. The list of resources 116 may be stored in a table, database or any data structure and used to modify or edit an access control list attached to a particular resource. The access control list is a list attached to a single resource that lists the accounts or groups that can access the single resource. The access control list may be populated or edited using a list of resources 116. One of ordinary skill in the art would recognize that the list of resources may be stored in a variety of manners.

In one example, the powerbox 112 receives a request from the polalauncher 110 and runs the application 102 within the restricted user account 104, which is created or was previously created and provided with the group access authorities 120. The powerbox 112 may also be configured to receive a request from a user of the application 102 to access other computer resources and modify the access authorities through the list of resources 116.

Figure 2:
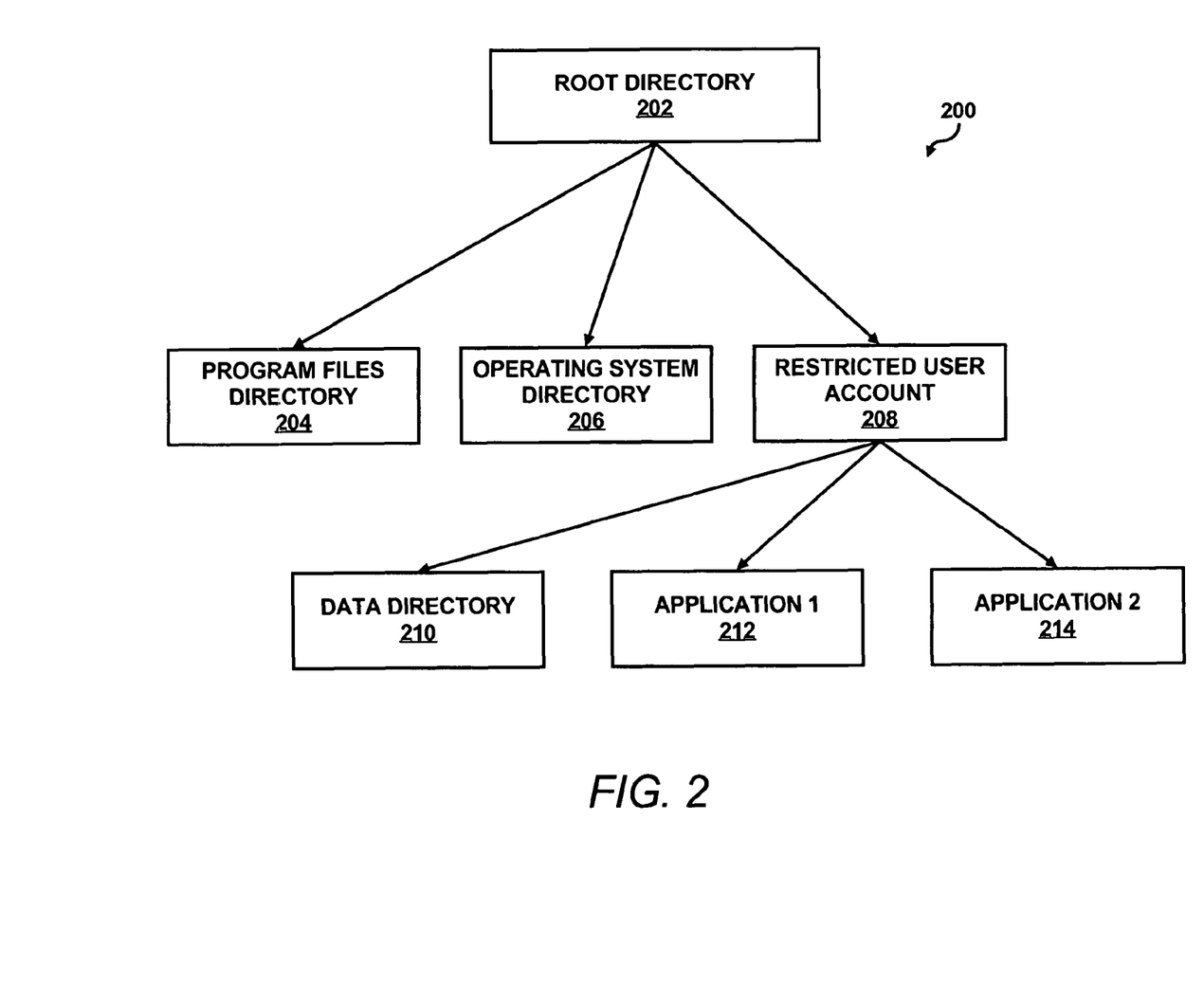
FIG. 2 shows a block diagram of a directory system with access authorities in accordance with an example of the invention.

With reference now to FIG. 2, there is shown a block diagram of a directory system 200 with access authorities. The directory system 200 may include a plurality of directories including but not limited to a root directory 202, a program files directory 204, an operating system directory 206, a user account directory 208, a data directory 210, an application 1 directory 212, and an application 2 directory 214.

The root directory 202, for instance, may include the group access authorities 120 and directory traverse authority. Both the program files directory 204 and the operating system directory 206 may also include group access authorities 120. In this manner, the group access authorities 120 provide the restricted user account group 114 and thus the restricted user account 104 and the application 102 with access authorities to run executable files located in the application 1 directory 212 and the application 2 directory 214 and supporting files located in the operating system directory 206. The individual access authorities 122 may extend the access authorities of application 102 to include access to a file within the data directory 210 and the application 1 directory 212 if needed. In another instance, the individual access authorities 122 may extend the access authorities of the application 102 to include access to a file or subdirectory within the program files directory 204.

Figure 3:
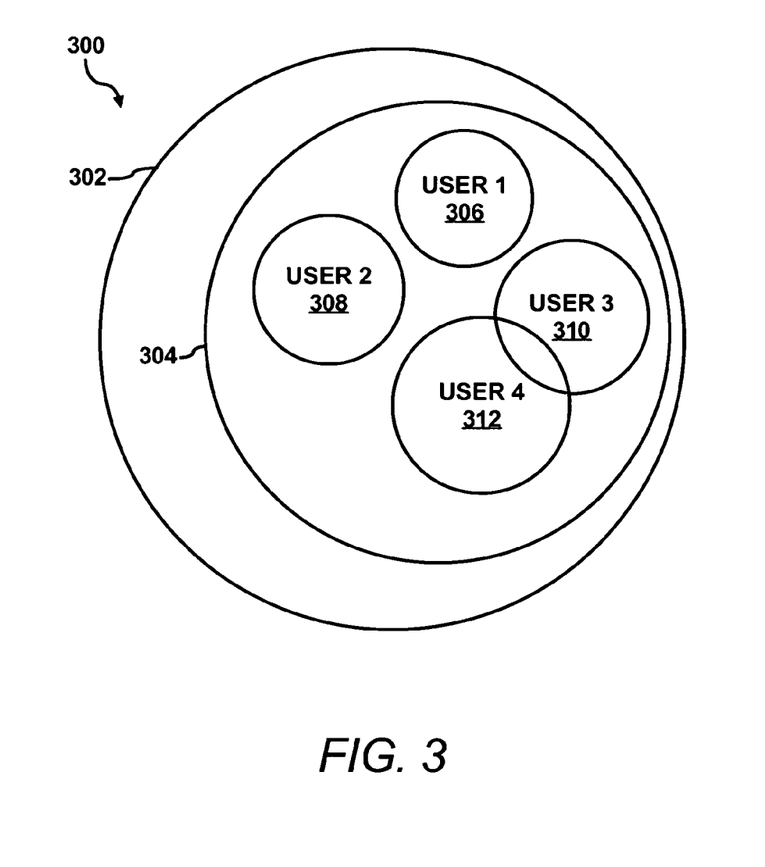
FIG. 3 shows a Venn diagram of user accounts in accordance with an example of the invention.

With reference now to FIG. 3, there is shown a Venn diagram 300 of a user account and restricted user accounts in accordance with an example of a computer system. An administrative account 302 may have access to all resources available in a computer system while a user account 304 may have access to all resources available to that particular user. User accounts, such as user account 304, typically have access to fewer resources than the administrative account 302. However, many user accounts may have access to all resources available in a computer system thus increasing the need for additional protections. The Venn diagram 300 also includes four smaller circles representing four restricted user accounts 306-312 having access to a predetermined set of resources. The first restricted user account 306 has access to the fewest number of resources. For example, the first restricted user account 306 may have access to a single executable file or application. The second restricted user account 308 has access to more resources while the third restricted user account 310 has access to even more resources. In the Venn diagram 300, the forth restricted user account 312 has access to the most systems resources although access is limited to a subset of the resources available to the user which itself is a subset of resources available in the computer system.

The system resources may be designated by the administrator of the system. For example, the administrator may determine that a particular user needs access to all text files in certain folders but should not have access to any files containing financial information while an administrator of a company should have access to any file containing financial information but not have access to any file containing confidential client information. The administrator may designate authorities to user accounts accordingly.

One of ordinary skill in the art would recognize that the any number of restricted user accounts may be created having a plurality of possible permission settings. Additionally, multiple restricted user accounts may be designated for multiple instances of the same application. That is multiple instances of one application may be simultaneously running on the same computer system. For example, a first instance may be started by a user double-clicking on an icon for the application, and while the first instance is running, the user may double-click on the icon again which starts a second instance of the application. Each instance runs in its own restricted user account which can limit the spread of viruses within a computer system.

In one example, the restricted user accounts 306-312 may be accounts for the same user of the user account 304. However, the restricted user accounts 306-312 were created to run the applications described above in an environment where the applications have access to limited resources instead of all the resources of the user account 304. Thus, a virus infecting any of the applications is substantially confined to the resources available to the infected application.

Figure 4:
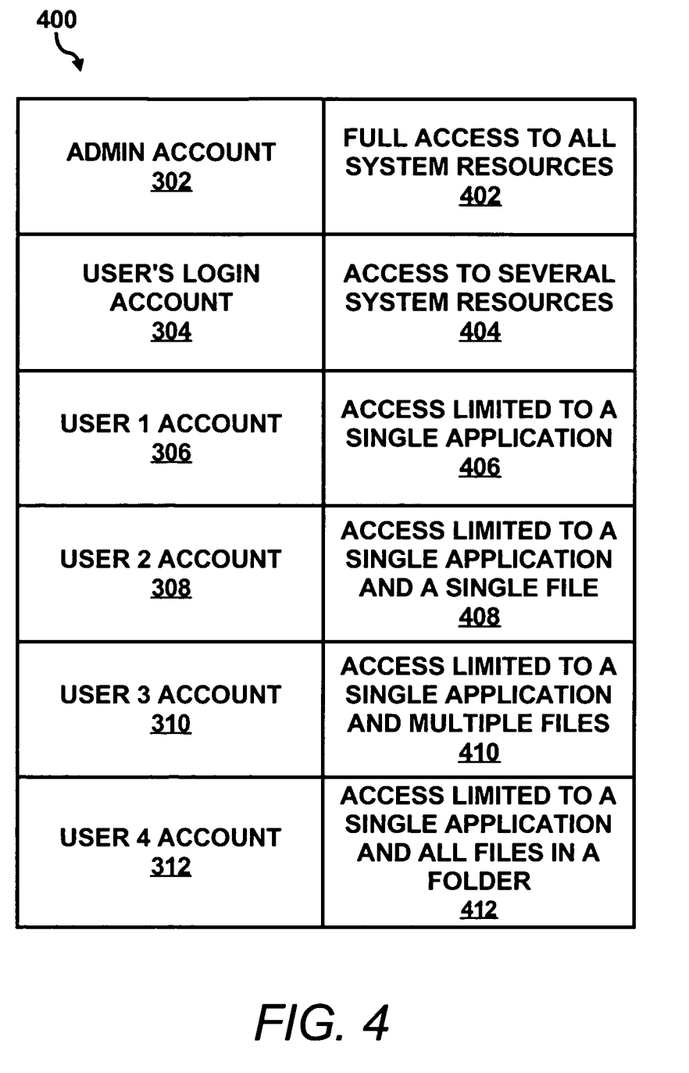
FIG. 4 shows a table of access authorities for accounts in accordance with an example of the invention.

FIG. 4 shows a table 400 of user account authorities in accordance with the Venn, diagram of FIG. 3. The administrative account 302 has access to all systems resources, shown in entry 402, in the computer system. The user account 304, or the user's login account, has access to several system resources, shown in entry 404. The system resources may be designated by the administrator of the system. For example, the administrator may determine that a particular user needs access to all text files in certain folders but should not have access to any files containing financial information while an administrator of a company should have access to any file containing financial information but not have access to any file containing confidential client information. The administrator may designate authorities to user accounts accordingly.

The first restricted user account 406 has access to a single application, shown in entry 406. The first restricted user account 306 may have been created to run a single executable file, such as, a game, calculator or any other program that runs as a single application. The second restricted user account 308 has access to a single application and contact information, including an e-mail address, shown in entry 408. The second restricted user account 308 may have been created to run a word processor and notify an alert computer if attacked by a virus that propagates by way of e-mail. The third restricted user account 310 has access to a single application and contact information, including a network address, shown in entry 410. The third restricted user account 310 may have been created to run a spread sheet program and notify an alert computer if attacked by a virus that collects and transmits a user's information to another computer system. The fourth restricted user account 312 has access to a single application and contact information, including an e-mail address and a network address, shown in entry 412. The fourth restricted user account 312 may have been created to run the application 102. The description of the restricted user accounts above are for illustrative purposes only. One of ordinary skill in the art would recognize that the any number of restricted user accounts may be created having a plurality of possible permission settings.

One of the possible permission settings may include allowing or disallowing an account to change permission settings. If an account where given permission to change write or execute permissions or to change permissions to access other applications, the restrictions placed on the account may become moot. Therefore, the restrictions placed on the account may include no permissions to add or modify permissions even to the resources over which the account has write authority.

Figure 5:
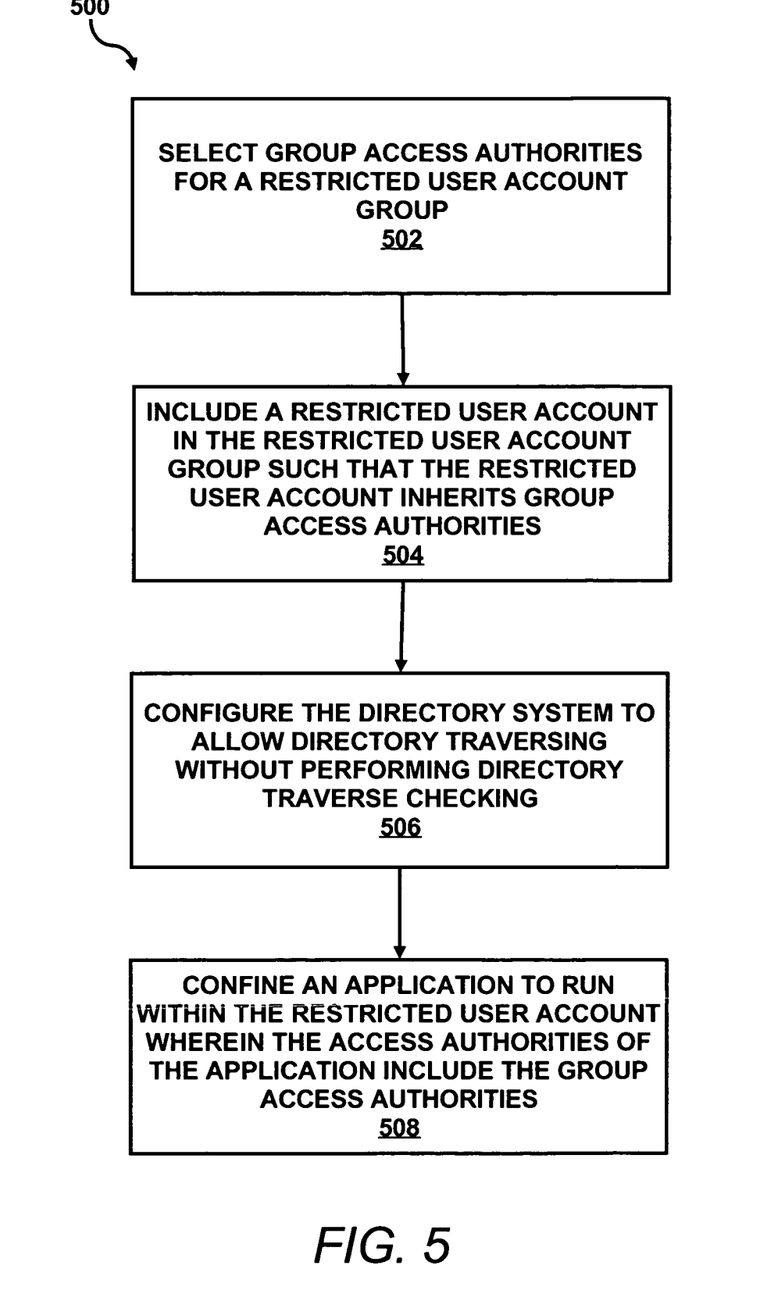
FIG. 5 shows a flow diagram of an operational mode of a system for selecting access authorities in accordance with an example of the invention.

FIG. 5 shows a flow diagram of an operational mode 500 of an example of a system for selecting access authorities. The following description of the operational mode 500 is made with reference to the system 100 illustrated in FIG. 1, and thus makes reference to the elements cited therein. The following description of the operational mode 500 is one manner in which the system 100 may be implemented. In this respect, it is to be understood that the following description of the operational mode 500 is but one manner of a variety of different manners in which such a system may be operated.

In the operational mode 500, the set-up program 106 selects group access authorities 120 for a restricted user account group 114 at step 502. The set-up program 106 includes the restricted user account 104 in the restricted user account group 114 such that the restricted user account 104 inherits the group access authorities 120 at step 504. The set-up program 106 configures the directory system 200 to allow directory traversing without performing directory traverse checking at step 506. The application 102 is confined to run within the restricted user account 104 such that the access authorities of the application 102 include the group access authorities 120 at step 508.

Figure 6:
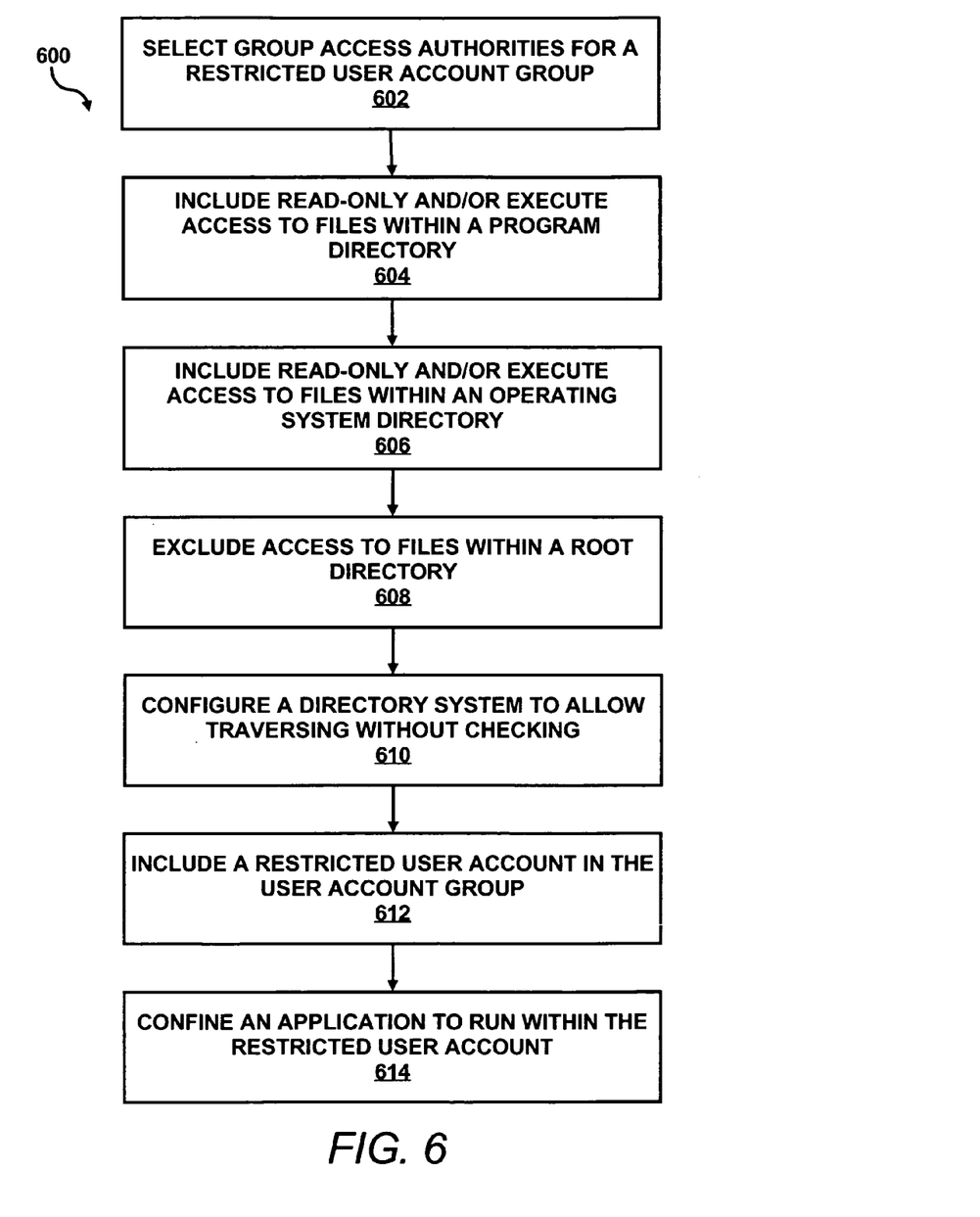
FIG. 6 shows a flow diagram of an operational mode of a system for selecting access authorities in accordance with another example of the invention.

FIG. 6 shows a flow diagram of an operational mode 600 of another example of a system for selecting access authorities. The following description of the operational mode 600 is made with reference to the system 100 illustrated in FIG. 1 and the directory system illustrated in FIG. 2, and thus makes reference to the elements cited therein. The following description of the operational mode 600 is one manner in which the system 100 may be implemented. In this respect, it is to be understood that the following description of the operational mode 600 is but one manner of a variety of different manners in which such a system may be operated.

In the operational mode 600, the set-up program 106 selects group access authorities 120 for a restricted user account group 114 at step 602. The set-up program 106 selects the group access authorities 120 to include read-only and/or execute access to files within the program files directory 204 at step 604. The set-up program 106 selects the group access authorities 120 to include read-only and/or execute access to files within the operating system directory 206 at step 606. The set-up program 106 selects the group access authorities 120 to exclude access to files within the root directory 208 at step 608. The set-up program 106 may also configure the directory traverse checker 118 to allow directory traversing without performing directory traverse checking at step 610. The set-up program 106 includes the restricted user account 104 in the restricted user account group 114 such that the restricted user account 104 inherits the group access authorities 120 at step 612. The application 102 is confined to run within the restricted user account 104 such that the access authorities of the application 102 include the group access authorities 120 at step 614.

Figure 7:
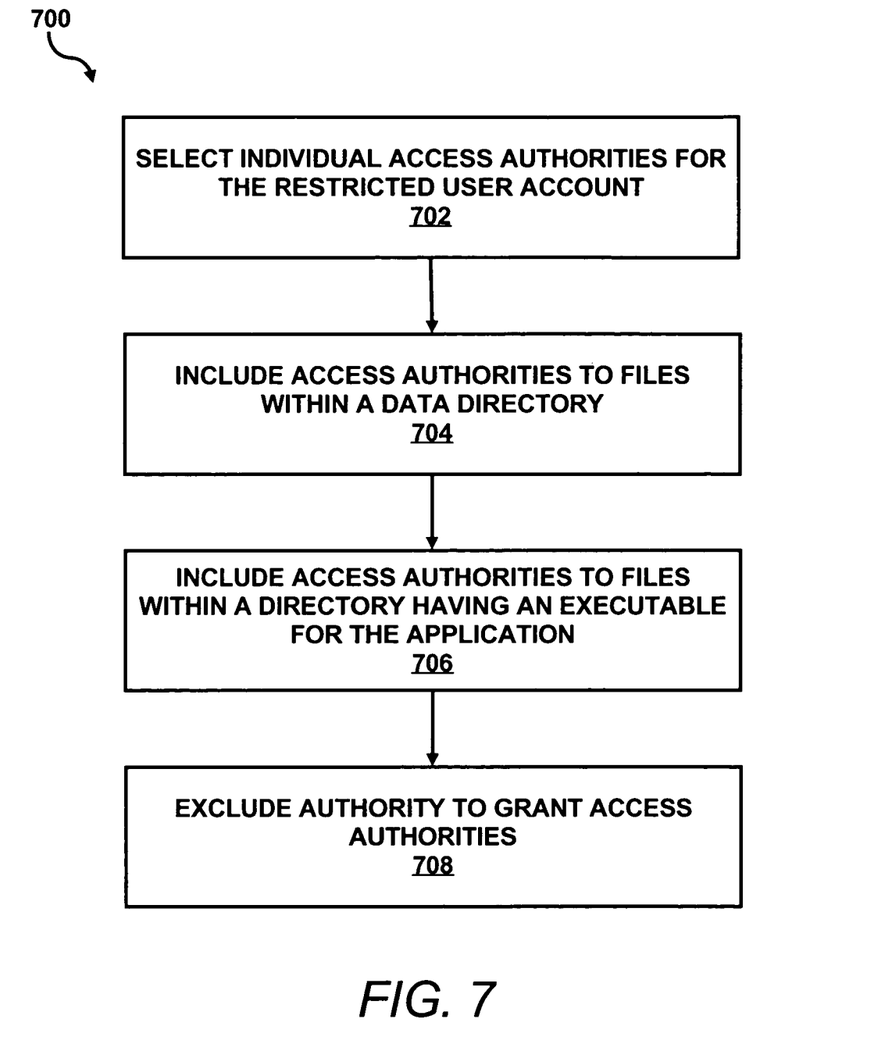
FIG. 7 shows a flow diagram of an operational mode of a system for selecting access authorities in accordance with another example of the invention.

FIG. 7 shows a flow diagram of an operational mode 700 of another example of a system for selecting access authorities. The following description of the operational mode 700 is made with reference to the system 100 illustrated in FIG. 1 and the directory system 200 illustrated in FIG. 2, and thus makes reference to the elements cited therein. The following description of the operational mode 700 is one manner in which the system 100 may be implemented. In this respect, it is to be understood that the following description of the operational mode 700 is but one manner of a variety of different manners in which such a system may be operated.

In the operational mode 700, the polarizer 108 selects the individual access authorities 122 for a restricted user account 104 at step 702. The polarizer 108 selects the individual access authorities 122 to include access to files within the data directory 210 at step 704. The polarizer 108 selects the individual access authorities 122 to include access to files within a directory having an executable for the application 102 at step 704. This directory may be a subdirectory within the program files directory 204. In order to function properly, some legacy programs write to a file or files within the program files directory 204 or a subdirectory thereof. This inclusion may allow legacy programs to operate in the system 100. The polarizer 108 selects the individual access authorities 122 to exclude authority to grant access authorities at step 708. This exclusion protects against virus spreading by thwarting a virus's attempt to grant itself access authorities and thus spread to other files and directories in the directory system 202.

Some of the steps illustrated in the operational modes 500, 600, and 700 may be contained as a utility, program, subprogram, in any desired computer accessible medium. In addition, the operational modes 500, 600 and 700 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 8:
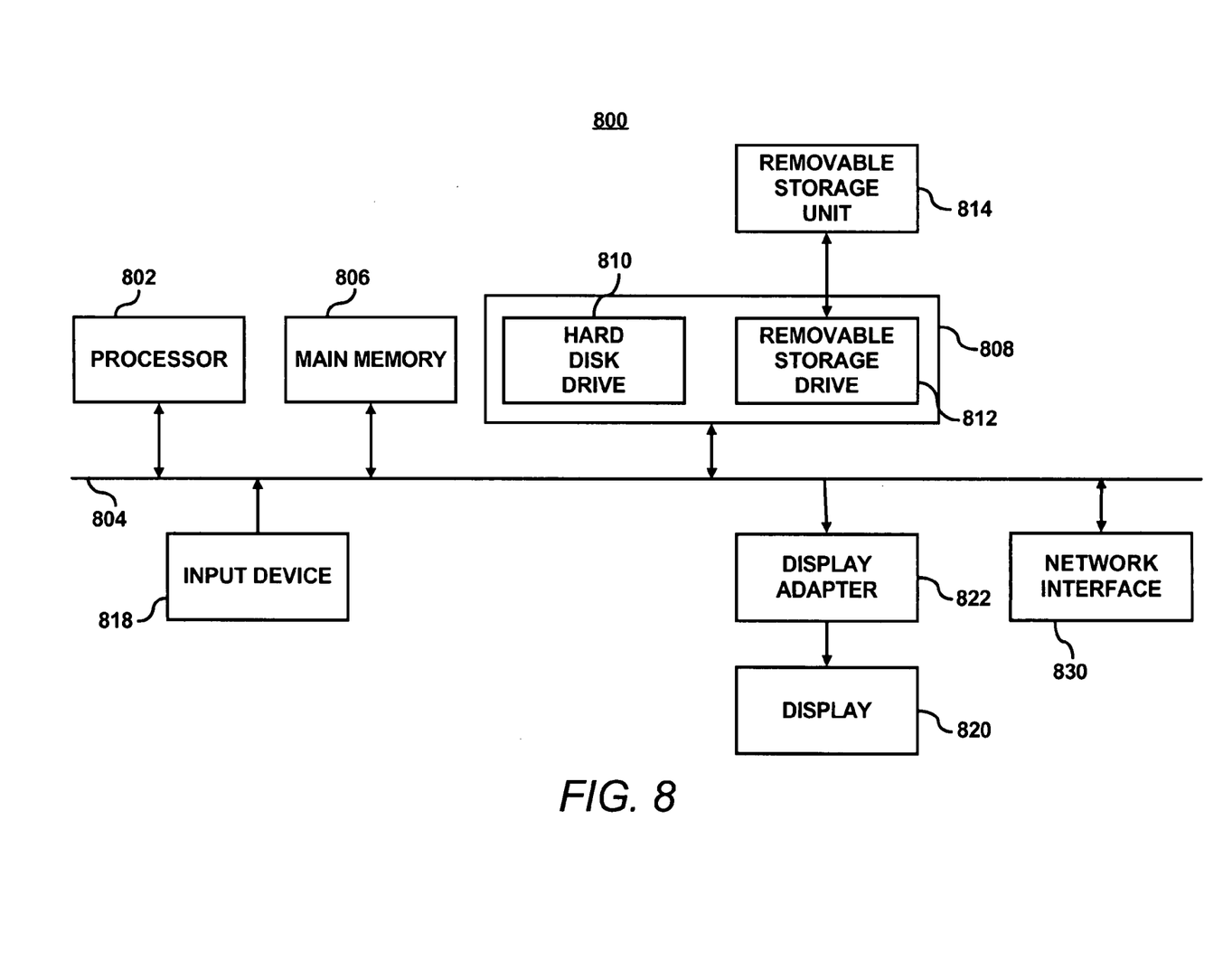
FIG. 8 shows a schematic diagram of a computer system in which examples of the invention may be implemented.

FIG. 8 illustrates an exemplary block diagram of a computer system 800 that may run the application 102 shown in FIG. 1. The computer system 800 includes one or more processors, such as processor 802, providing an execution platform for executing software, such as the application 102, the set-up program 106, the polarizer 108, the polalauncher 110, and the powerbox 112. The processor 802 may also execute an operating system (not shown) for executing the software in addition to performing operating system tasks.

Commands and data from the processor 802 are communicated over a communication bus 804. The computer system 800 also includes a main memory 806, such as a Random Access Memory (RAM), where software may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., or a nonvolatile memory where a copy of the software may be stored. Applications and some resources, such as files, may be stored in the secondary memory 808 and transferred to the main memory 806 during run time. The secondary memory 808 may also include ROM (read only memory), EPROM (erasable, programmable ROM), EEPROM (electrically erasable, programmable ROM).

A user interfaces with the computer system 800 with one or more input devices 818, such as a keyboard, a mouse, a stylus, and the like. The display adaptor 822 interfaces with the communication bus 804 and the display 820 and receives display data from the processor 802 and converts the display data into display commands for the display 820. The user interacts with the application 102 through the use of the input devices 818 and display 820. A network interface 830 is provided for communicating with other nodes.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method of selecting access authorities in a directory system, the method comprising:
   selecting group access authorities for a restricted user account group, the group access authorities including directory traverse authority;
   including a restricted user account in the restricted user account group such that the restricted user account inherits the group access authorities;
   configuring the directory system to allow directory traversing without performing directory traverse checking; and
   confining an application to run within the restricted user account wherein the access authorities of the application include the group access authorities.

2. The method of claim 1 wherein selecting the group access authorities further comprises selecting the group access authorities including at least one of read-only and execute access to program files.

3. The method of claim 1 wherein selecting the group access authorities further comprises selecting the group access authorities including at least one of read-only and execute access to operating system files.

4. The method of claim 1 wherein selecting the group access authorities further comprises selecting the group access authorities excluding access to files within a root directory.

5. The method of claim 1 further comprising:
selecting individual access authorities for the restricted user account such that the access authorities for the application includes the group access authorities and the individual access authorities.

6. The method of claim 5 wherein selecting the individual access authorities further comprises selecting the individual access authorities including access to data files.

7. The method of claim 5 wherein selecting the individual access authorities further comprises selecting the individual access authorities including access to an executable file for the application.

8. The method of claim 7 wherein selecting the individual access authorities further comprises selecting the individual access authorities excluding access permission grant authority.

9. A method of selecting access authorities, the method comprising:
using a set-up program to select group access authorities for a restricted user account group and to configure a directory traverse checker to allow directory traversing without performing directory traverse checking;
including directory traverse authority in the group access authorities;
including a restricted user account in the restricted user account group such that the restricted user account inherits the group access authorities including the directory traverse authority; and
confining an application to run within the restricted user account wherein the access authorities of the application include the group access authorities.

10. The method of claim 9, further comprising:
including in the group access authorities at least one of read-only and execute access to program files.

11. The method of claim 9, further comprising:
including in the group access authorities at least one of read-only and execute access to operating system files.

12. The method of claim 9, further comprising:
excluding in the group access authorities access to files within a root directory.

13. The method of claim 9 further comprising:
using a polarizer to select individual access authorities for the restricted user account such that the access authorities for the application includes the group access authorities and the individual access authorities.

14. The method of claim 13, further comprising:
including in the individual access authorities access to data files.

15. The method of claim 14, further comprising:
including in the individual access authorities access to an executable file for the application.

16. The method of claim 15 further comprising:
excluding in the individual access authorities access permission grant authority.

17. A computer readable medium on which is embedded one or more computer programs, said one or more computer programs implementing a method for selecting access authorities, said one or more computer programs comprising a set of instructions for:
selecting group access authorities for a restricted user account group, the group access authorities including directory traverse authority;
turning off a directory traverse checker for a directory system in which the group access authorities are used;
including a restricted user account in the restricted user account group such that the restricted user account inherits the group access authorities;
selecting individual access authorities for the restricted user account; and
confining an application to run within the restricted user account such that the access authorities for the application includes the group access authorities and the individual access authorities.

18. The computer readable medium according to claim 17, the one or more computer programs further comprising a set of instructions for:
including in the group access authorities at least one of read-only and execute access to files within an operating system directory and to program files.

19. The computer readable medium according to claim 18, the one or more computer programs further comprising a set of instructions for:
excluding in the group access authorities access to files within a root directory.

20. The computer readable medium according to claim 17, the one or more computer programs further comprising a set of instructions for:
including in the individual access authorities access to data files.

21. A computer system comprising:
a data storage device to store computer program instructions; and
at least one processor to execute the computer program instructions to:
create a restricted user account group having group access authorities, the group access authorities including directory traverse authority;
configure a directory system to allow directory traversing without performing directory traverse checking;
include a restricted user account in the restricted user account group; and
confine an application to run within the restricted user account.

22. The computer system of claim 21, wherein the computer program instructions are executed by the at least one processor to create the restricted user account.

23. The computer system of claim 22, wherein the computer program instructions ructions are executed by the at least one processor to select individual access authorities for the restricted user account.

24. A computer system comprising:
at least one data storage device to store computer program instructions; and
at least one processor to execute the computer program instructions to:
select a restricted user account group having group access authorities, the group access authorities including directory traverse authority;
configure a directory traverse checker to allow directory traversing without performing traverse checking; and
inherit the group access authorities in a restricted user account.

25. The computer system of claim 24, wherein the at least one data storage device stores a program files directory having an executable file and wherein the group access authorities includes at least one of read-only and execute access to program files.

26. The computer system of claim 24, wherein the at least one data storage device stores an operating system directory having a support file and wherein the group access authorities includes at least one of read-only and execute access to operating system files.

27. The computer system of claim 24, wherein the at least one data storage device stores a root directory having a file and wherein the group access authorities excludes access to files within the root directory.

28. The computer system of claim 24, wherein the at least one data storage device stores a polarizer to select individual access authorities for the restricted user account.

29. The computer system of claim 28, wherein the at least one data storage device stores a data directory having a file and wherein the individual access authorities includes access to the file within the data directory.

30. The computer system of claim 29, wherein the individual access authorities excludes permission to grant access authorities.

* * * * *

UNITED STATES PATENT AND TRADEMARK OFFICE
CERTIFICATE OF CORRECTION

PATENT NO. : 8,627,068 B1  
APPLICATION NO. : 11/118158  
DATED : January 7, 2014  
INVENTOR(S) : Mark S. Miller et al.

Page 1 of 1

It is certified that error appears in the above-identified patent and that said Letters Patent is hereby corrected as shown below:

In the Claims

In column 10, line 46, in Claim 23, after "instructions" delete "ructions".

Signed and Sealed this  
Twenty-fourth Day of June, 2014

Michelle K. Lee  
*Deputy Director of the United States Patent and Trademark Office*